No. 883,968. PATENTED APR. 7, 1908.
M. C. MASON.
MILK PAIL COVER.
APPLICATION FILED JULY 22, 1907.
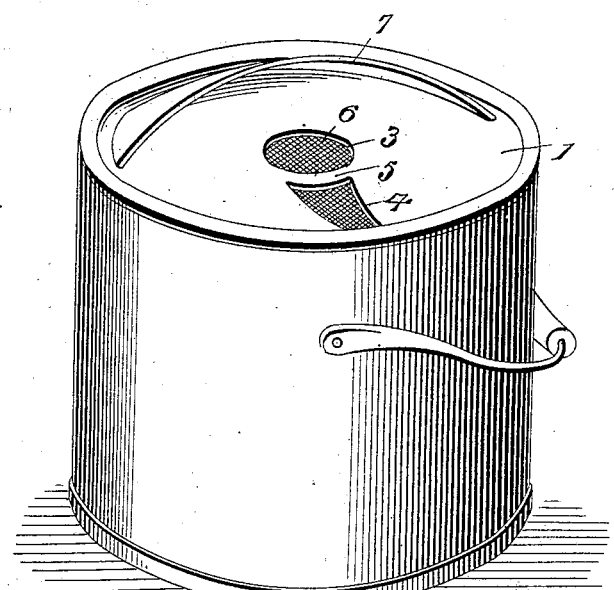
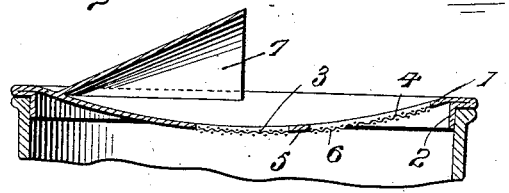
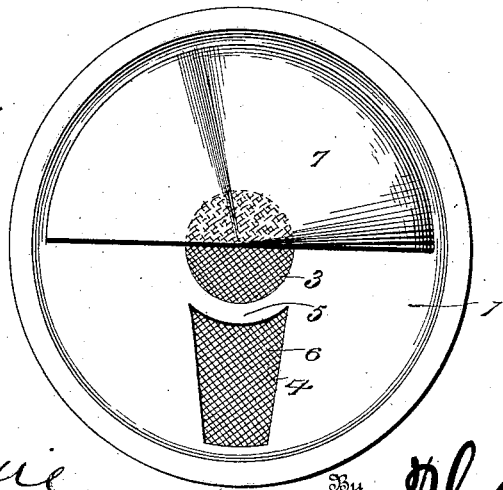
Witnesses
Inventor
M. C. Mason
By
Attorneys

UNITED STATES PATENT OFFICE.

MALINDA C. MASON, OF WAUKEGAN, ILLINOIS.

MILK-PAIL COVER.

No. 883,968.

Specification of Letters Patent.

Patented April 7, 1908.

Application filed July 22, 1907. Serial No. 384,939.

*To all whom it may concern:*

Be it known that I, MALINDA C. MASON, a citizen of the United States, residing at Waukegan, in the county of Lake and State of Illinois, have invented certain new and useful Improvements in Milk-Pail Covers, of which the following is a specification.

The present invention aims to provide a novel cover for milk pails and the like and contemplates the provision of an improved construction whereby the milk is quickly carried under cover and thereby prevented from absorbing the foul odors of the milking stable.

The invention also has for its object to provide a cover of this character which is of simple and inexpensive construction and which can be readily applied to the pail in such a manner as to prevent any appreciable loss of the contents of the pail should the same be accidentally overturned.

For a full description of the invention and the merits thereof and also to acquire a knowledge of the details of construction and the means for effecting the result, reference is to be had to the following description and accompanying drawings, in which:

Figure 1 is a perspective view showing a milk pail cover embodying the invention.
Fig. 2 is a vertical sectional view through the cover. Fig. 3 is a top plan view of the same.

Corresponding and like parts are referred to in the following description and indicated in all the views of the drawings by the same reference characters.

The body portion 1 of the cover corresponds in shape to the mouth of the milk pail or other receptacle to which it is applied and is formed at its periphery with the usual annular flange 2 adapted to engage the upper edge of the pail. The body portion 1 of the cover is dished and slopes gradually and evenly at all points from the edge to the center. A hood 7 is secured to the cover and extends preferably over one half of the same, as clearly illustrated in the drawing.

The body portion 1 of the cover is formed with a radially elongated opening extending from its outer edge to and past the center, said opening being formed in that portion of the body which is exposed and extending at right angles to the inner edge of the hood 7, with its innermost end underneath the hood, as clearly illustrated in Fig. 3. This radial elongated opening preferably gradually widens towards its inner end, where it is rounded and the body portion of the cover is formed with a curved bar 5 extending across the said opening so as to reinforce the cover and compensate for any weakening effect that the opening would otherwise produce. By means of this cross bar the said opening is divided into two parts or sections the innermost one of which is preferably circular, but to all practical intents and purposes there is but one opening, the location and extent of which is above set forth. The two said sections of the opening, designated 3 and 4, respectively, are provided with a straining screen 6 which is preferably applied to the bottom of the cover, a single piece of the screening serving for the entire opening and being reinforced by means of the bar 5. It will thus be apparent that any milk or other liquid which may fall upon the cover will be deflected inwardly and will enter the pail through the screen or strainer 6.

From the foregoing description in connection with the accompanying drawing it is evident that in the use of my improved milk pail cover, the hood will effectively exclude foreign matter such as dirt and hair from the screens. It will also be apparent that as the opening in the body portion of the cover is radially elongated on the exposed side of the cover and extends underneath the hood, the stream of milk falling from the teats will most naturally be directed immediately to the screen or straining portion, which will avoid all splashing and which will insure the immediate conveying of the milk into the pail and under cover where it will be prevented from contamination by absorbing the odors of the stable.

Having thus described the invention, what is claimed as new is:

A cover for milk pails, comprising a supporting flange and a body portion the latter being depressed to the central point gradually from all sides, and a hood secured to said body portion with its inner edge assuming a diametrical relation to the body portion, the said body portion being formed with a radially elongated opening extending from its outer edge to and past the center underneath the hood and formed with a bar extending across said opening whereby to reinforce the body portion, the said walls, of the opening diverging inwardly, and the opening extending at right angles to the inner edge of the hood, and a screen secured to the body portion and circumscribing said opening.

In testimony whereof I affix my signature in presence of two witnesses.

MALINDA C. MASON. [L. S.]

Witnesses:
CLARIBEL DAKE,
EDWARD J. DAKE.